United States Patent
Suzuki et al.

(10) Patent No.: US 8,768,420 B2
(45) Date of Patent: Jul. 1, 2014

(54) MOBILE TERMINAL

(75) Inventors: Hiromichi Suzuki, Hamura (JP); Isao Ohba, Hachioji (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 751 days.

(21) Appl. No.: 12/206,913

(22) Filed: Sep. 9, 2008

(65) Prior Publication Data
US 2009/0069062 A1 Mar. 12, 2009

(30) Foreign Application Priority Data

Sep. 12, 2007 (JP) ................................ 2007-236857

(51) Int. Cl.
*H04W 88/02* (2009.01)

(52) U.S. Cl.
USPC ...................................................... 455/575.1

(58) Field of Classification Search
USPC .............. 455/575.1–575.7, 550.1, 556.1, 455/90.1–90.3; 343/700–703
See application file for complete search history.

(56) References Cited

U.S. PATENT DOCUMENTS

| | | | | |
|---|---|---|---|---|
| 6,995,719 | B2 * | 2/2006 | Ide | 343/702 |
| 7,046,204 | B2 * | 5/2006 | Satoh et al. | 343/702 |
| 7,158,083 | B2 * | 1/2007 | Satoh et al. | 343/702 |
| 7,787,922 | B2 * | 8/2010 | Yamazaki et al. | 455/575.7 |
| 2006/0055608 | A1 * | 3/2006 | Minemura | 343/702 |
| 2006/0116157 | A1 * | 6/2006 | Takamori et al. | 455/550.1 |
| 2009/0131129 | A1 * | 5/2009 | Yamazaki et al. | 455/575.7 |
| 2010/0240423 | A1 * | 9/2010 | Takagi et al. | 455/575.3 |

FOREIGN PATENT DOCUMENTS

| | | |
|---|---|---|
| JP | 3112464 B2 | 9/2000 |
| JP | 2005-033551 A | 2/2005 |

* cited by examiner

*Primary Examiner* — Diane Mizrahi
(74) *Attorney, Agent, or Firm* — Maschoff Brennan

(57) ABSTRACT

A mobile terminal includes a first antenna configured to receive power from the first circuit board housed in the first housing, a second antenna configured to receive power from the second circuit board housed in the second housing, a first signal cable configured to electrically connect the first circuit board to the second circuit board and transmit a signal between the first circuit board and the second circuit board, and a second signal cable configured to electrically connect the first circuit board to the second circuit board and bypasses a board current flowing through the first signal cable from the first circuit board to the second antenna during operation of the second antenna.

16 Claims, 4 Drawing Sheets

(b) Radiation pattern of second antenna with portrait screen (embodiment)

(a) Radiation pattern of second antenna with landscape screen (embodiment)

(b) Radiation pattern of first antenna with landscape screen (embodiment)

(a) Radiation pattern of second antenna with landscape screen (prior art)

(a) Radiation pattern of first antenna with landscape screen (prior art)

(a) Radiation pattern of first antenna with portrait screen (embodiment)

(b) Radiation pattern of second antenna with portrait screen (embodiment)

(a) Radiation pattern of first antenna with portrait screen (prior art)

(b) Radiation pattern of second antenna with portrait screen (prior art)

MOBILE TERMINAL

CROSS-REFERENCE TO RELATED APPLICATIONS

This application is based upon and claims the benefit of priority from prior Japanese Patent Application No. 2007-236857, filed Sep. 12, 2001, the entire contents of which are incorporated herein by reference.

BACKGROUND OF THE INVENTION

1. Field of the Invention

The present invention relates to a mobile terminal such as a mobile phone or a personal digital assistant (PDA) and, more particularly, to a mobile terminal designed such that two housings are connected to each other via a connection mechanism rotatable in three-dimensional directions, and are respectively provided with antennas.

2. Description of the Related Art

In general, a radio communication device has a plurality of antennas provided in a housing and performs diversity reception. Many antenna units used for diversity reception each comprise a combination of a rod antenna to be pulled out from the housing, and an inverted F antenna housed in the housing, and the like.

Among recent mobile terminals such as mobile phones and PDAs, apparatuses comprising built-in antennas are the mainstream. Apparatuses having two antennas used for diversity reception, both of which comprise built-in antennas, have been proposed (see, for example, Japanese Patent No. 3112464).

In general, the housing of a mobile terminal such as a mobile phone has a small size. For this reason, if two antennas for diversity reception both comprise built-in antennas, it is difficult to secure a sufficient distance between the antennas. An increasing number of mobile terminals are being designed such that the two housings are rotary connected to each other via a connection mechanism such as a hinge mechanism, and the form of the housings can be changed in accordance with the usage scene. Some of these terminals can obtain good diversity performance in a given form of the housings but cannot obtain required diversity performance in another form of the housings. This problem leads to a very undesirable situation that it is impossible to obtain an expected data transmission rate when transmitting rich contents such as moving images by using a high-speed wireless interface such as a WLAN (Wireless Local Area Network), EVDOrev.A, HSDPA (High Speed Downlink Packet Access), or MIMO (Multiple Input Multiple Output).

BRIEF SUMMARY OF THE INVENTION

It is an object of the present invention to provide a mobile terminal which can always obtain a good diversity effect regardless of a change in the form of housings.

In order to achieve the above object, according to an aspect of the present invention, a mobile terminal includes a first antenna configured to receive power from the first circuit board housed in the first housing, a second antenna configured to receive power from the second circuit board housed in the second housing, a first signal cable configured to electrically connect the first circuit board to the second circuit board and transmit a signal between the first circuit board and the second circuit board, and a second signal cable configured to electrically connect the first circuit board to the second circuit board and bypasses a board current flowing through the first signal cable from the first circuit board to the second antenna during operation of the second antenna.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The embodiments of the present invention will be described below with reference to the views of the accompanying drawing.

(First Embodiment)

Figure 1:
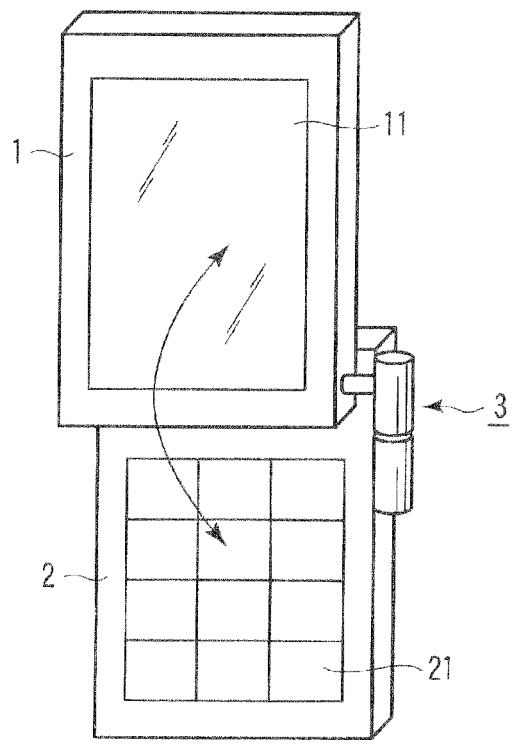
FIG. 1 is a perspective view showing the outer appearance of a mobile terminal according to the first embodiment of the present invention when the terminal is used with a portrait screen.
Figure 2:
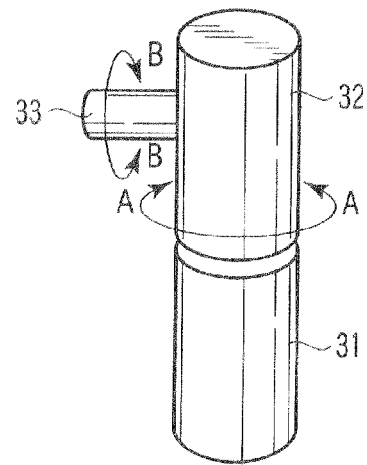
FIG. 2 is a perspective view showing the arrangement and operation of a connection mechanism in the form of the mobile terminal shown in FIG. 1.

FIGS. 1 and 2 are perspective views showing the outer appearance of a mobile terminal according to the first embodiment of the present invention.

The mobile terminal is designed such that first and second housings 1 and 2 comprising plate-like rectangular parallelepiped members are connected to each other via a connection mechanism 3. A display unit 11 comprising, for example, a liquid crystal is placed on the inner surface of the first housing 1. A keypad 21 is placed on the inner surface of the second housing 2.

Figure 4:
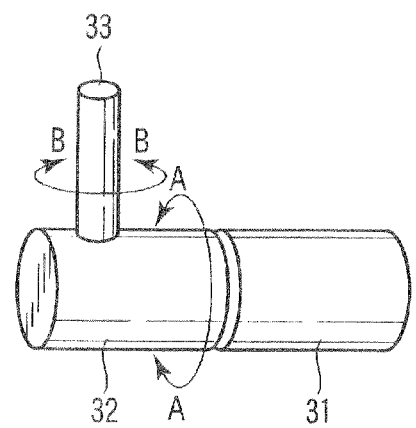
FIG. 4 is a perspective view showing the arrangement and operation of a connection mechanism in the form of the mobile terminal shown in FIG. 3.

As shown in FIGS. 2 and 4, the connection mechanism 3 comprises a fixed portion 31, a first rotating portion 32 which is connected to the fixed portion 31 rotatable in the arrow A-A direction in FIGS. 2 and 4, and a second rotating portion 33 which is connected to a side surface of the first rotating portion 32 rotatable in the arrow B-B direction in FIGS. 2 arid 4. The fixed portion 31 is fixed to a side surface portion of the second housing 2. The second rotating portion 33 is fixed to a side portion of the fixed portion 31.

In the standby state, this mobile terminal is set in a folded state in which the inner surfaces of the first and second housings 1 and 2 face each other. When performing speech communication or transmission/reception of electronic mail, the user pivots the second rotating portion 33 of the connection mechanism 3 to pivot and open the first housing 1 in the vertical direction, as shown in FIG. 1. As a result, the mobile terminal is set in the form of a so-called portrait screen, in which the display unit 11 is placed in a vertical position. This sets the mobile terminal in a form suitable for speech communication or the transmission/reception of electronic mail.

Figure 3:
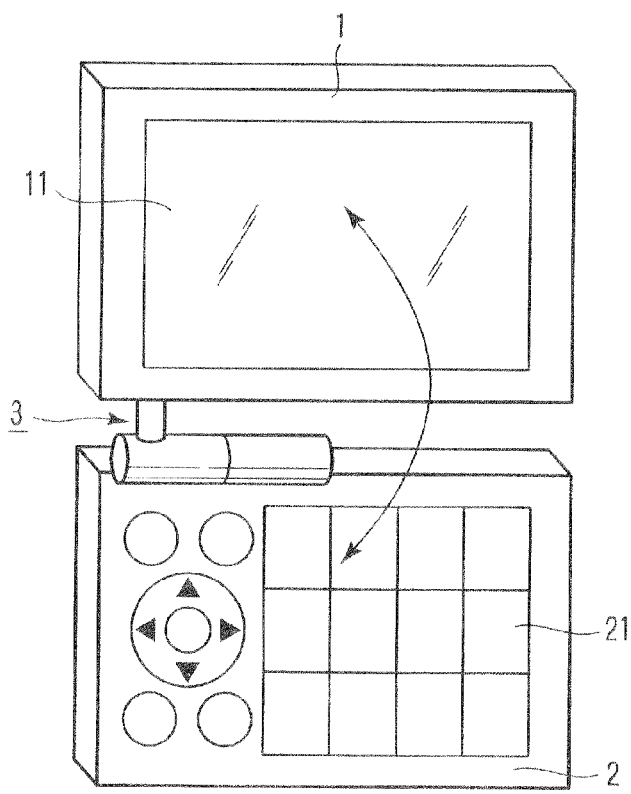
FIG. 3 is a perspective view showing the outer appearance of the mobile terminal according to the first embodiment of the present invention when the terminal is used with a landscape screen.

When, for example, receiving a television broadcast or performing so-called browsing, i.e., activating a browser and browsing a Web page, the user pivots the first rotating portion 32 of the connection mechanism 3 to pivot and open the first housing 1 in the horizontal direction, as shown in FIG. 3. As a result, the mobile terminal is set in the form of a so-called landscape screen, in which the display unit 11 is placed in a horizontal position. This sets the mobile terminal in a form suitable for viewing/listening of a television broadcast or browsing.

Figure 5:
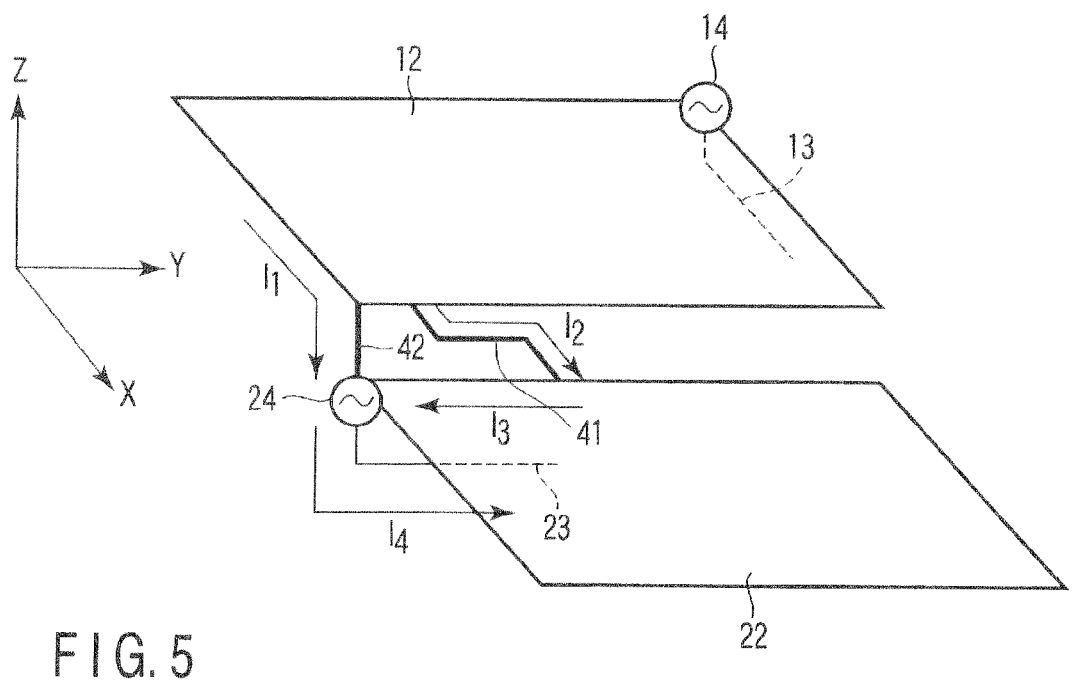
FIG. 5 is a perspective view showing the arrangement of internal units when the mobile terminal according to the first embodiment of the present invention is used with the landscape screen.

The first and second housings 1 and 2 house the following units. FIG. 5 is a perspective view showing the arrangement of the units. That is, the first and second housings 1 and 2 respectively house first and second circuit boards 12 and 22. A second antenna 23 is placed along a long side of the second circuit board 22 at its corner portion adjacent to the connection mechanism 3. The second antenna 23 comprises, for example, a ¼-wavelength inverted F antenna with the proximal end portion of an antenna element being connected to a power feed point 24 provided on the second circuit board and the distal end portion of the antenna element being open.

A first antenna 13 is placed along a short side of the first circuit board 12 at its corner portion located farthest from the second antenna 23, i.e., diagonal to the second antenna 23. Like the second antenna 23, the first antenna 13 comprises a ¼-wavelength inverted F antenna with the proximal end portion of an antenna element being connected to a power feed point 14 provided on the first circuit board and the distal end portion of the antenna element being open.

The first arid second antennas 13 and 23 are connected to a radio circuit via the power feed points 14 and 24, respectively. The radio circuit comprises a diversity reception function, and performs spatial diversity reception or pattern diversity reception by selectively using the first and second antennas 13 and 23. Note that the radio circuit is mounted on the first or second circuit board 12 or 22.

The first and second circuit boards 12 and 22 are electrically connected to each other via a first signal cable 41. The first signal cable 41 comprises a flexible wiring board on which a plurality of signal line patterns are printed. The first signal cable 41 is connected to the connectors of the first and second circuit boards 12 and 22 upon being inserted through hollow portions provided in the fixed portion 31 of the connection mechanism 3 and the first and second rotating portions 32 and 33. With this arrangement, various types of signals, e.g., display signals, transmission/reception signals, and control signals are transmitted between the first and second circuit boards 12 and 22.

The first and second circuit hoards 12 and 22 are electrically connected to each other via a second signal cable 42. Like the first signal cable 41, the second signal cable 42 comprises a flexible coaxial cable and is connected to the ground patterns of the first and second circuit boards 12 and 22 upon being inserted through hollow portions provided in the fixed portion 31 of the connection mechanism 3 and the first and second rotating portions 32 and 33. The connection position of the second signal cable 42 with respect to the second circuit board 22 is set at a position nearer to the power feed point 24 of the second antenna 23 than the connection position of the first signal cable 41 with respect to the second circuit board 22. More specifically, the above connection position is set at a position which is nearer to the power feed point 24 of the second antenna 23 than the connection position of the first signal cable 41, and falls within the range of ⅕ the wavelength of a radio signal from the power feed point 24 of the second antenna 23.

Figure 6:
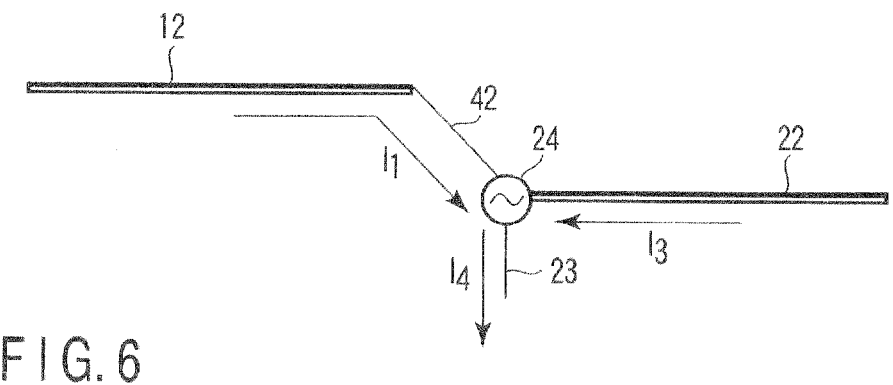
FIG. 6 is a longitudinal sectional view of the internal units of the mobile terminal shown in FIG. 5.

With this arrangement, when the first housing 1 is used in the form of the landscape screen as shown in FIG. 3, a board current flows from the ground pattern of the first circuit board 12 to the second antenna 23 during the operation of the second antenna 23. As shown in FIG. 5, board current paths include paths I2 and I3 in which currents flow through the first signal cable 41 and the second circuit board 22 and a path I1 in which a current flows through the second signal cable 42. As described above, the connection position of the second signal cable 42 is set at a position which is nearer to the power feed point 24 of the second antenna 23 than the connection position of the first signal cable 41 arid falls within the range of ⅕ the wavelength of a radio signal from the power feed point 24. For this reason, the path I1 is lower in impedance than the paths I2 and I3. As shown in FIG. 6, therefore, most of the board current flows through the path I1, and the values of currents flowing in the paths I2 and I3 decrease.

This can reduce the cancellation of the radiation pattern of the second antenna 23 due to currents flowing in the oaths I2 and I3 and improve the radiation pattern of the second antenna 23. That is, the second antenna 23 operates as if it were a dipole antenna. This makes the vertical polarization component of the radiation pattern almost nondirectional.

Figure 7A:
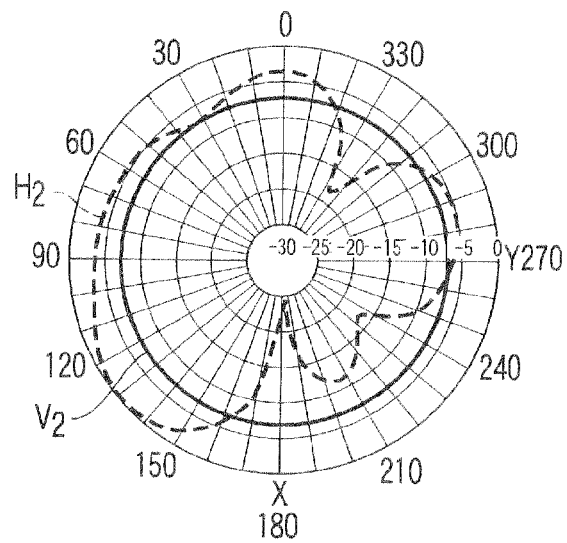
FIGS. 7A and 7B are views respectively showing the radiation patterns of the first and second antennas when the mobile terminal according to the first embodiment of the present invention is used with the landscape screen.
Figure 7B:
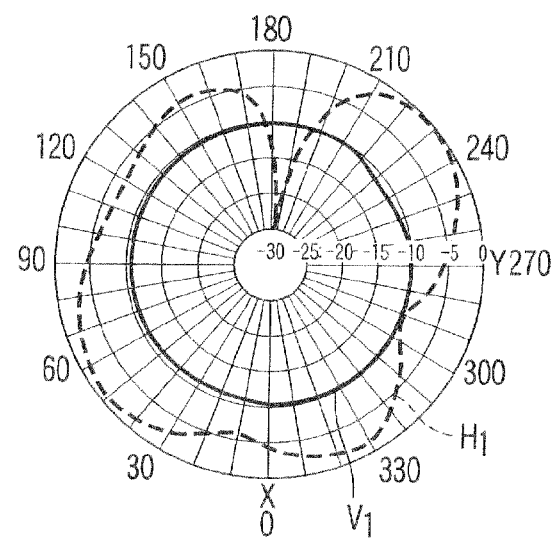
Figure 8A:
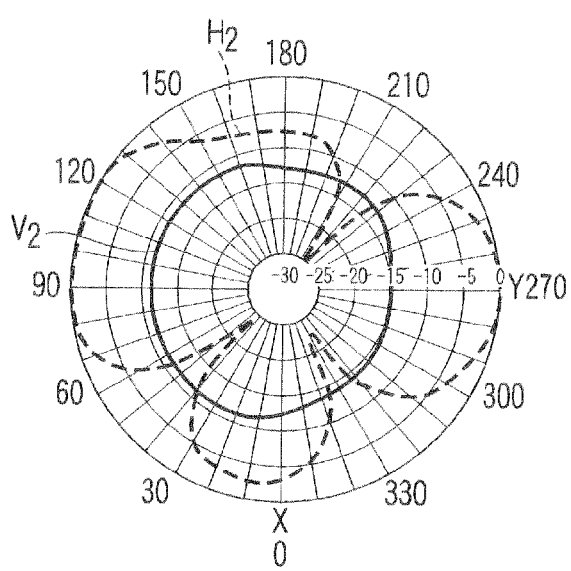
FIGS. 8A and 8B are views respectively showing the radiation patterns of the first and second antennas when a conventional mobile terminal is used with the landscape screen.
Figure 8B:
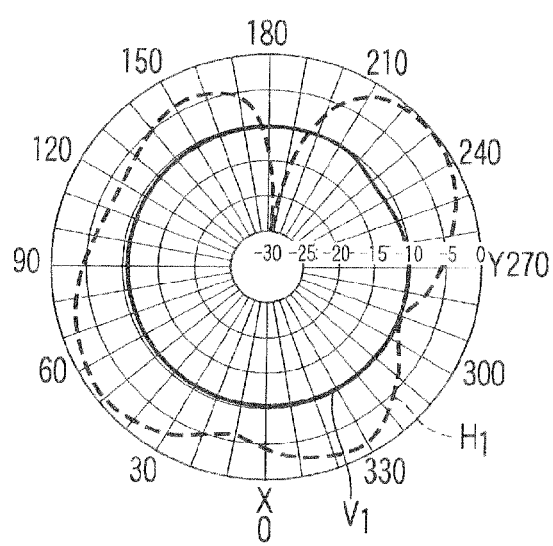

FIGS. 7A and 7B show the radiation patterns of the first and second antennas 13 and 23 when the mobile terminal according to the first embodiment is used with the landscape screen. FIG. 7A shows the radiation pattern of the second antenna 23. FIG. 7B shows the radiation pattern of the first antenna 13. FIGS. 8A and 8B show the radiation patterns of the first and second antennas in the conventional mobile terminal in which the first and second circuit boards 12 and 22 are not connected to each other via the second signal cable 42.

As is obvious from FIG. 7A, a vertical polarization component V2 of the radiation pattern of the second antenna 23 is almost nondirectional, and a sufficient gain can be obtained as compared with the prior art (FIG. 8A). With regard to a horizontal polarization component H2, a radiation pattern smaller in the number of valleys of directivity than a conventional radiation pattern can be obtained. Therefore, performing spatial or pattern diversity reception using the second antenna 23 and the first antenna 13 makes it possible to always obtain good reception sensitivity characteristics regardless of the posture of the terminal.

Even when the mobile terminal is used in the form of the portrait screen as shown in FIG. 1, most of a board current flows through the second signal cable 42, and the value of a current flowing through the first signal cable 41 and the second circuit board 22 becomes small. Therefore, the radiation pattern of the second antenna 23 is improved. That is, when the mobile terminal is used with the portrait screen, the second antenna 23 operates as f it were a dipole antenna. As a consequence, the vertical polarization component of the radiation pattern has a pattern close to that of nondirectivity.

Figure 9A:
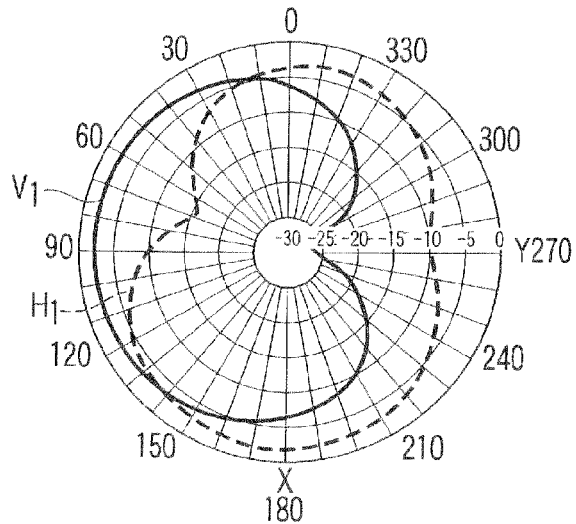
FIGS. 9A and 9B are views respectively showing the radiation patterns of the first and second antennas when the mobile terminal according to the first embodiment of the present invention is used with the portrait screen.
Figure 9B:
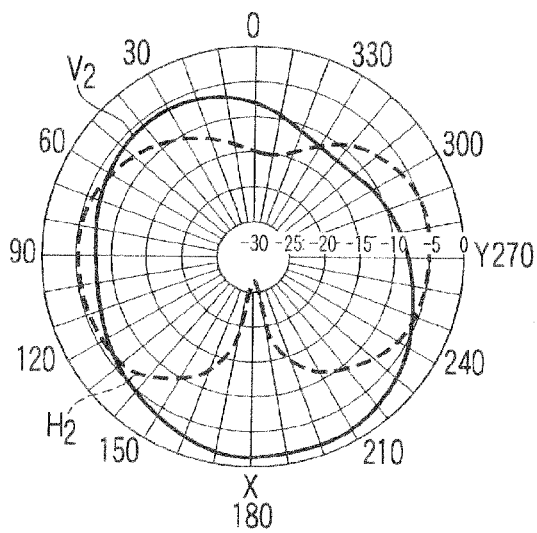
Figure 10A:
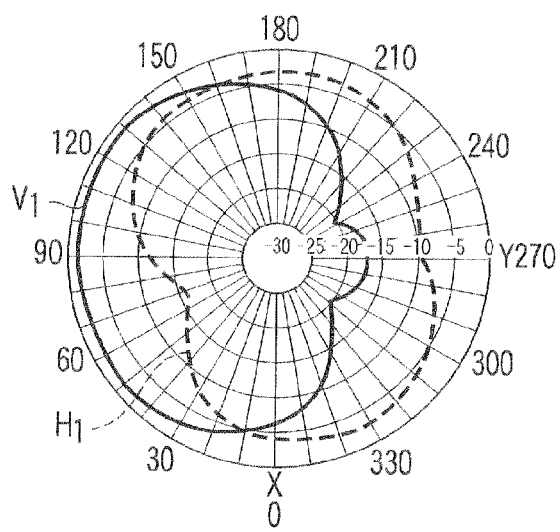
FIGS. 10A and 10B are views respectively showing the radiation patterns of the first and second antennas when the conventional mobile terminal is used with the portrait screen.
Figure 10B:
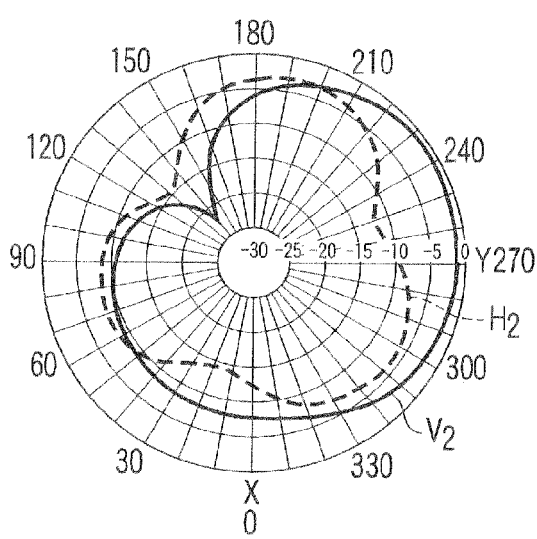

FIGS. 9A and 9B show the radiation patterns of the first and second antennas 13 and 23 when the mobile terminal according to the first embodiment is used with the portrait screen. FIGS. 10A and 10B show the radiation patterns of the first and second antennas 13 and 23 when the conventional mobile terminal without the second signal cable 42 is used with the portrait screen. As shown in FIG. 9B, since the directivity of the vertical polarization component of the second antenna 23 is close to nondirectivity, performing pattern diversity reception using the second antenna 23 can effectively complement the radiation pattern (FIG. 9A) of the first antenna 13 and obtain good reception sensitivity characteristics regardless of the position of the mobile terminal.

As described above, according to the first embodiment, the mobile terminal has the first and second housings 1 and 2 connected to each other via the connection mechanism 3 rotatable in three-dimensional directions, and incorporates the second antenna 23 near the connection mechanism 3 of the second housing 2 and the first antenna 13 at the corner portion located farthest from the second antenna 23 of the first housing 1. In this mobile terminal, the first and second circuit boards 12 and 22 respectively housed in the first and second housings 1 and 2 are connected to each other via the second signal cable 42 in addition to the first signal cable 41, and the connection position of the second signal cable 42 with respect to the second circuit board 22 is set at a position which is nearer to the power feed point 24 of the second antenna 23 than the connection position of the first signal cable 41, and falls within ⅕ the wavelength of a radio signal from the power feed point 24.

Therefore, most of a board current flows from the ground pattern of the first circuit board 12 to the second antenna 23 via the second signal cable 42 during the operation of the second antenna 23, and a current flowing through the first signal cable 41 and the second circuit board 22 is suppressed to a small value. This can reduce the cancellation of the radiation pattern of the second antenna 23 due to a current flowing through the first signal cable 41 and the second circuit board 22, and make the vertical polarization component of the radiation pattern of the second antenna 23 become almost nondirectional with a sufficiently large gain.

Performing spatial or pattern diversity reception using the second antenna 23 and the first antenna 13 can therefore obtain good reception sensitivity characteristics even when the mobile terminal is used with the landscape screen. In general, in a wireless LAN, a radio signal transmitted from a base station contains a vertical polarization component as a main component. That is, improving reception sensitivity characteristics for the vertical polarization component of an antenna radiation pattern produces good effects, in particular, when a wireless LAN is used.

(Second Embodiment)

In the first embodiment, the ground patterns of the first and second circuit boards 12 and 22 are always connected to each other via the second signal cable 42. In contrast to this, in the second embodiment, a change in the posture of a terminal is detected by a sensor or the like, and the second signal cable 42 is connected/disconnected in accordance with the posture after the change.

Figure 11:
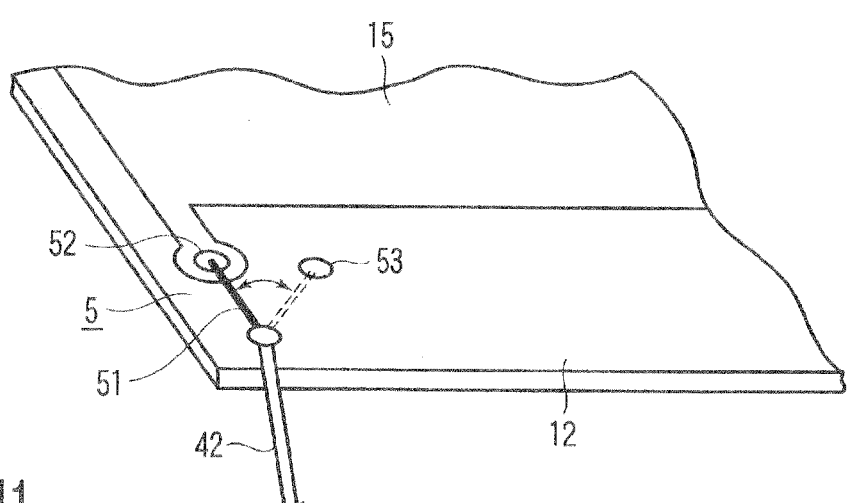
FIG. 11 is a perspective view showing the arrangement of the main part of a mobile terminal according to the second embodiment of the present invention.

FIG. 11 shows an example of a switch 5 to be used to connect/disconnect the second signal cable 42. The switch 5 comprises a movable contact 51 and first and second fixed contacts 52 and 53. The first fixed contact 52 is provided on a ground pattern 15 of a first circuit board 12. The second fixed contact 53 is provided on an insulating board. A second signal cable 42 is connected to the movable contact 51.

The switch 5 is switched/controlled by a control circuit (not shown). As the control circuit, a CPU (Central Processing Unit) is used, which has already been provided to control the communication operation and display operation of the mobile terminal and management operation for data such as telephone directory data. The control circuit comprises a table representing the relationship between the posture of the terminal and the switched state of the switch. This table stores in advance the switched state of the switch 5, which corresponds to a state in which optimal reception sensitivity is obtained in each position of the mobile terminal in correspondence with each of a plurality of different postures which the mobile terminal can take. The control circuit receives information representing the direction of the housing which is detected by, for example, an acceleration sensor, and reads out information representing the corresponding switched state of the switch 5 from the table on the basis of the detection information about the direction of the housing. Based on this readout information representing the switched state, the control circuit then outputs a switching control signal to ON/OFF-control the switch 5.

With this arrangement, when, for example, it is detected that the first housing 1 is set in the form of the landscape screen as shown in FIG. 3, the control circuit (not shown) outputs a switching control signal to connect the movable contact 51 of the switch 5 to the first fixed contact 52. In this case, therefore, the ground patterns of the first circuit board 12 and a second circuit board 22 are connected to each other via the second signal cable 42. This improves the directivity of the vertical polarization component of the radiation pattern of a second antenna 23.

In contrast, when it is detected that the form of the housing has changed to another predetermined form, the control circuit (not shown) outputs a switching control signal to connect the movable contact 51 of the switch 5 to the second fixed contact 53. In this case, therefore, the first and second circuit boards 12 and 22 connected via the second signal cable 42 are disconnected. This can prevent the connection of the second signal cable 42 from influencing the radiation pattern of the second antenna 23.

(Other Embodiments)

The second embodiment is configured to ON/OFF-control the switch in accordance with the posture of the mobile terminal. However, the present invention is not limited to this. It suffices to determine whether the communication mode of the terminal is a speech communication mode or a data communication mode such as a mode for transmission/reception of mail or downloading of data from a WEB server, and to ON/OFF-control the switch in accordance with the determination result. Alternatively, it suffices to determine whether the housing of the terminal is in the open or closed state, and to ON/OFF-control the switch in accordance with the determination result. The operation in either case can be implemented by making the control circuit ON/OFF-control the switch on the basis of the control table.

As the switch 5, a semiconductor switch may be used instead of a mechanical switch. Alternatively, it suffices to use a variable impedance element as the switch and to turn on/off the connection between the first and second circuit boards 12 and 22 by changing the impedance value of the variable impedance element in accordance with a detection result on the form of the housing or the posture of the terminal.

The type and arrangement of the second signal cable, the connection position with respect to the second circuit board, the shape and arrangement of each housing of the mobile terminal, the types and arrangement positions of the first and second antennas, the arrangement of the connection mechanism for pivoting the housings in three-dimensional directions, and the like can be variously modified within the spirit and scope of the invention.

Note that the present invention is not limited to each embodiment described above, and constituent elements can be variously modified and embodied at the execution stage within the spirit and scope of the invention. Various inventions can be formed by proper combinations of a plurality of constituent elements disclosed in the above embodiments. For example, several constituent elements may be omitted from all the constituent elements in each embodiment. In addition, constituent elements of the different embodiments may be combined as needed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile terminal having a first housing in which a first circuit board is housed, a second housing in which a second circuit board is housed, and a radio circuit mounted on the first circuit board or the second circuit board, with the first housing and the second housing being connected to each other via a connection mechanism rotatable in three-dimensional directions, the terminal comprising:
   a first antenna configured to receive power from a first power feed point on the first circuit board housed in the first housing;
   a second antenna disposed at a corner portion of the second circuit board adjacent to the connection mechanism and configured to receive power from a second power feed point on the corner portion of the second circuit board housed in the second housing;
   a first signal cable disposed to pass through a hollow portion in the connection mechanism and configured to electrically connect the first circuit board to the second circuit board and transmit a signal between the first circuit board and the second circuit board; and
   a second signal cable disposed to pass through the hollow portion in the connection mechanism and configured to electrically connect the first circuit board to the second circuit board and bypass a board current flowing through the first signal cable from the first circuit board to the second antenna during operation of the second antenna;
   wherein the first signal cable is connected to the second circuit board at a first connection position, the second signal cable is connected to the second circuit board at a second connection position, and the second connection position is nearer to the second power feed point than the first connection position and located in a range of ⅕ of a wavelength of a radio signal transmitted/received by the second antenna from the second power feed point, and
   wherein the first antenna is disposed at a corner portion of the first circuit board farthest from the second antenna, and the first and second antennas are connected to the radio circuit via the first and second power feed points, respectively, so that the radio circuit performs spatial diversity reception or pattern diversity reception of the radio signal by selectively using the first antenna and the second antenna.

2. The terminal according to claim 1, wherein
   the second antenna is placed along a first side extending from the corner portion, as a start point, of the second circuit board which is adjacent to the connection mechanism, and
   the first antenna is placed along a second side extending from a second corner portion, as a start point, of the first circuit board, which is located in a diagonal direction with respect to the corner portion of the second circuit board, in a direction perpendicular to the first side.

3. The terminal according to claim 1, wherein a connection position of the second signal cable with respect to the second circuit board is set at a position nearer to a power feed point for the second antenna than a connection position of the first signal cable with respect to the second circuit board.

4. The terminal according to claim 1, further comprising:
   a switch circuit configured to set on/off connection between the first circuit board and the second circuit board via the second signal cable;
   a posture detector configured to detect postures of the first housing and the second housing which are changed by the connection mechanism; and
   a switch control circuit configured to ON/OFF-control the switch circuit in accordance with a detection result obtained by the posture detector.

5. The terminal according to claim 1, further comprising:
   a switch circuit configured to set on/off connection between the first circuit board and the second circuit board via the second signal cable;
   a communication mode detection circuit configured to detect a type of communication mode of the mobile terminal; and
   a switch control circuit configured to ON/OFF-control the switch circuit in accordance with a detection result obtained by the communication mode detection circuit.

6. The terminal according to claim 4 or 5, wherein
   the switch circuit comprises a variable impedance element; and
   the switch control circuit variably controls an impedance of the variable impedance element in accordance with the detection result.

7. The terminal according to claim 1, wherein the connection mechanism comprises:
   a fixed portion fixed to a corner portion of the second housing;
   a first rotating portion connected to the fixed portion rotatable in a first direction; and
   a second rotating portion which has one end portion connected to a side surface portion of the first rotating portion and the other portion fixed to a corner portion of the first housing and supports the first housing on the first rotating portion rotatable in a second direction perpendicular to a pivotal axis of the first rotating portion.

8. A mobile terminal comprising:
   a first housing;
   a second housing;

a connection mechanism configured to connect the first housing and the second housing rotating in three-dimensional directions;
a first circuit board which is housed in the first housing and has a first power feed point and a ground pattern;
a second circuit board which is housed in the second housing and has a second power feed point disposed on a corner portion of the second circuit board and a ground pattern;
a first antenna which is housed in the first housing and connected to the first power feed point;
a second antenna which is housed in the second housing, disposed at the corner portion of the second circuit board adjacent to the connection mechanism, and connected to the second power feed point;
a radio circuit, provided on one of the first circuit board and the second circuit board, configured to perform diversity reception of a radio signal by selectively operating the first antenna and the second antenna;
a first signal cable disposed to pass through a hollow portion in the connection mechanism and configured to electrically connect the first circuit board and the second circuit board and transmit a signal between the first circuit board and the second circuit board; and
a second signal cable disposed to pass through the hollow portion in the connection mechanism and configured to further connect ground patterns of the first circuit board and the second circuit board at a position of the second circuit board which is nearer to the second power feed point than a connection position of the first signal cable and bypass a board current flowing through the first signal cable from the first circuit board to the second antenna during operation of the second antenna,
wherein the first signal cable is connected to the second circuit board at a first connection position, the second signal cable is connected to the second circuit board at a second connection position, and the second connection position is nearer to the second power feed point than the first connection position and located in a range of $1/5$ of a wavelength of a radio signal transmitted/received by the second antenna from the second power feed point, and
wherein the first antenna is disposed at a corner portion of the first circuit board farthest from the second antenna, and the first and second antennas are connected to the radio circuit via the first and second power feed points, respectively, so that the radio circuit performs spatial diversity reception or pattern diversity reception of the radio signal by selectively using the first antenna and the second antenna.

9. The terminal according to claim 8, wherein
the second antenna is placed along a first side extending from the corner portion, as a start point, of the second circuit board which is adjacent to the connection mechanism, and
the first antenna is placed along a second side extending from a second corner portion, as a start point, of the first circuit board, which is located in a diagonal direction with respect to the corner portion of the second circuit board, in a direction perpendicular to the first side.

10. The terminal according to claim 8, wherein a connection position of the second signal cable with respect to the second circuit board is set at a position nearer to a power feed point for the second antenna than a connection position of the first signal cable with respect to the second circuit board.

11. The terminal according to claim 8, further comprising:
a switch circuit configured to set on/off connection between the first circuit board and the second circuit board via the second signal cable;
a posture detector configured to detect postures of the first housing and the second housing which are changed by the connection mechanism; and
a switch control circuit configured to ON/OFF-control the switch circuit in accordance with a detection result obtained by the posture detector.

12. The terminal according to claim 8, further comprising:
a switch circuit configured to set on/off connection between the first circuit board and the second circuit board via the second signal cable;
a communication mode detection circuit configured to detect a type of communication mode of the mobile terminal; and
a switch control circuit configured to ON/OFF-control the switch circuit in accordance with a detection result obtained by the communication mode detection circuit.

13. The terminal according to claim 11 or 12, wherein
the switch circuit comprises a variable impedance element; and
the switch control circuit variably controls an impedance of the variable impedance element in accordance with the detection result.

14. The terminal according to claim 8, wherein the connection mechanism comprises:
a fixed portion fixed to a corner portion of the second housing;
a first rotating portion connected to the fixed portion rotatable in a first direction; and
a second rotating portion which has one end portion connected to a side surface portion of the first rotating portion and the other portion fixed to a corner portion of the first housing and supports the first housing on the first rotating portion rotatable in a second direction perpendicular to a pivotal axis of the first rotating portion.

15. A mobile terminal comprising:
a first plate-like housing in which a first circuit board having a first power feed point and a ground pattern is housed;
a second plate-like housing in which a second circuit board having a second power feed point, disposed on a corner portion of the second circuit board, and a ground pattern is housed;
a connection mechanism configured to connect a corner portion of the first plate-like housing to a corner portion of the second plate-like housing and hold the first plate-like housing and the second plate-like housing rotatable in three-dimensional directions;
a first inverted F antenna connected to the first power feed point placed at a corner portion located diagonal to a corner portion of the first plate-like housing to which the connection mechanism is connected and placed along a first side extending from the corner portion;
a second inverted F antenna disposed at the corner portion of the second circuit board adjacent to the connection mechanism and connected to the second power feed point placed at a corner portion of the second plate-like housing to which the connection mechanism is connected and placed along a second side perpendicular to a direction of the first side;
a radio circuit mounted on the first circuit board or the second circuit board;
a first signal cable disposed to pass through a hollow portion in the connection mechanism and configured to electrically connect the first circuit board and the second circuit board and transmit a signal between the first circuit board and the second circuit board; and a second signal cable disposed to pass through the hollow portion in the connection mechanism and configured to connect ground patterns of the first circuit board and the second circuit board at a position of the second circuit board which is nearer to the second power feed point than a connection position of the first signal cable and bypass a board current flowing through the first signal cable from the first circuit board to the second antenna during operation of the second antenna, wherein the first signal cable is connected to the second circuit board at a first connection position, the second signal cable is connected to the second circuit board at a second connection position, and the second connection position is nearer to the second power feed point than the first connection position and located in a range of $\frac{1}{5}$ of a wavelength of a radio signal transmitted/received by the second inverted F antenna from the second power feed point, and wherein the first inverted F antenna is disposed at a corner portion of the first circuit board farthest from the second inverted F antenna, and the first and second inverted F antennas are connected to the radio circuit via the first and second power feed points, respectively, so that the radio circuit performs spatial diversity reception or pattern diversity reception of the radio signal by selectively using the first antenna and the second antenna.

16. The terminal according to claim 15, wherein the connection mechanism comprises:

a fixed portion fixed to a corner portion of the second housing;

a first rotating portion connected to the fixed portion rotatable in a first direction; and a second rotating portion which has one end portion connected to a side surface portion of the first rotating portion and the other portion fixed to a corner portion of the first housing and supports the first housing on the first rotating portion rotatable in a second direction perpendicular to a pivotal axis of the first rotating portion.

* * * * *